United States Patent Office 2,824,896
Patented Feb. 25, 1958

2,824,896

KETONE AND ALCOHOLS

Joseph Donald Surmatis, Pompton Plains, N. J., assignor to Hoffmann-La Roche Inc., Nutley, N. J., a corporation of New Jersey No Drawing. Application August 18, 1955
Serial No. 529,354

3 Claims. (Cl. 260—593)

This invention relates to novel chemical compounds, and to novel processes and intermediates useful in their preparation. An important aspect of the invention relates to the novel compounds 6,8-dimethyl-2-nonanone, 3,7,9-trimethyl-1-decyn-3-ol and 3,7,9-trimethyl-1-decen-3-ol. 3,7,9-trimethyl-1-decen-3-ol and 6,8-dimethyl-2-nonanone are useful as odor-imparting agents, for example in the preparation of perfumes and of other scented compositions; and accordingly the invention finds application in the perfume, cosmetic, and flavor industries.

In one comprehensive embodiment, the invention provides a process for the preparation of 3,7,9-trimethyl-1-decen-3-ol which comprises reducing 6,8-dimethyl-5-nonen-2-one thereby forming 6,8-dimethyl-2-nonanone, ethinylating 6,8-dimethyl-2-nonanone thereby forming 3,7,9-trimethyl-1-decyn-3-ol, and selectively reducing the acetylenic bond in 3,7,9-trimethyl-1-decyn-3-ol to an olefinic bond.

A preferred method of executing this aspect of the invention comprises the steps of reacting 6,8-dimethyl-5-nonen-2-one with approximately one molar proportion of elemental hydrogen in the presence of a hydrogenation catalyst thereby producing 6,8-dimethyl-2-nonanone, reacting 6,8-dimethyl-2-nonanone with approximately one molar proportion of acetylene in the presence of an alkaline condensation agent, thereby producing 3,7,9-trimethyl-1-decyn-3-ol, and reacting 3,7,9-trimethyl-1-decyn-3-ol with approximately one molar proportion of elemental hydrogen in the presence of a hydrogenation catalyst preferentially favoring the reduction of acetylenic bonds to the olefinic stage only. Hydrogenation catalysts having this last specified characteristic are well known to those skilled in the art, e. g. see the publication by Lindlar, Helvetica Chimica Acta 35, 446 (1952).

An especially advantageous and preferred mode of operation comprises reducing 6,8-dimethyl-5-nonen-2-one with elemental hydrogen in the presence of a palladium-on-charcoal catalyst at moderately elevated temperature and under superatmospheric pressures thereby producing 6,8-dimethyl-2-nonanone, reacting the latter with acetylene in liquid ammonia medium and in the presence of sodium (or sodium amide) thereby producing 3,7,9-trimethyl-1-decyn-3-ol, and catalytically hydrogenating the latter with elemental hydrogen in the presence of a lead-palladium-on calcium carbonate catalyst, of the type specifically taught by Lindlar at page 450 of the above cited publication.

The starting material 6,8-dimethyl-5-nonen-2-one is itself a novel compound, not hitherto described in a printed publication. In order that the instant disclosure may be complete, the preparation of said starting material is described below, but 6,8-dimethyl-5-nonen-2-one and its preparation are not claimed as part of the instant invention.

PREPARATION OF 6,8-DIMETHYL-5-NONEN-2-ONE 438 grams of 3,5-dimethyl-1-hexen-3-ol was stirred with 1500 cc. of concentrated aqueous hydrochloric acid (37% by weight HCl concentration) at room temperature for 30 minutes. The oil layer was separated, washed twice, each time with 500 cc. of water, and dried over calcium chloride. The product obtained, 1-chloro-3,5-dimethyl-2-hexene, had $n_D^{25} = 1.448$.

In a five-liter flask there was placed three liters of benzene, 429 g. of ethyl acetoacetate and 162 g. of sodium methylate. 428 g. of the product described above, 1-chloro-3,5-dimethyl-2-hexene, was added at 60° C. within 30 minutes, and stirring was continued for six hours at 60–70° C. The reaction mixture was washed with two liters of water and the benzene was distilled off under a vacuum of 100 mm. to yield 3-carbethoxy-6,8-dimethyl-5-nonen-2-one as a straw-colored oil.

The entire quantity of 3-carbethoxy-6,8-dimethyl-5-nonen-2-one produced above was dissolved in 2 liters of ethyl alcohol. To this was added 200 g. of solid potassium hydroxide and 200 cc. of water. The mixture was stirred for 4 hours at 40–50° C. To the resulting solution of the potassium salt of 3-carboxy-6,8-dimethyl-5-nonen-2-one was then added concentrated aqueous hydrochloric acid (37% by weight HCl) from a separatory funnel until the solution was strongly acid. Thirty minutes were required for the addition. The solution was then stirred an additional hour at 50° C.

The reaction mixture was diluted with two liters of water and the oil layer was removed by means of a separatory funnel. The aqueous portion was extracted with 500 cc. of benzene. The combined oils were washed neutral with water and fractionated. The product 6,8-dimethyl-5-nonen-2-one distilled at 120° C. at 35 mm., $n_D^{25} = 1.4432$. The 2,4-dinitrophenylhydrazone derivative melted at 47° C. The semicarbazone derivative melted at 114° C.

The invention is further disclosed in the following examples, which are illustrative but not limitative thereof:

*Example 1*

890 g. (5.3 mols) of 6,8-dimethyl-5-nonen-2-one was hydrogenated in the presence of 20 g. of 5% palladium-on-charcoal catalyst, at 1000 p. s. i. pressure and 80°–90° C. The hydrogenation stopped when 5.3 mols of hydrogen was consumed. The catalyst was filtered off and the filtrate was fractionated. The fraction having B. P. 84°–85°/10 mm. and $n_D^{25} = 1.4260–1.4272$ comprised essentially 6,8-dimethyl-2-nonanone. This compound has a pleasant fragrance reminiscent of that of wintergreen, and can be used in lieu of methyl salicylate in making improved tuberose compositions. It can also be used as a component of fruit aromas and of perfume bases similar to "Cuir de Russie."

*Example 2*

48.3 g. of metallic sodium was cut up into small pieces and dissolved in 2 liters of liquid ammonia. Acetylene gas was bubbled into the solution, while stirring, until the color changed from a deep blue to white, and then for an additional 30 minutes. 340 g. (2.0 mols) of 6,8-dimethyl-2-nonanone was dissolved in an equal volume of diethyl ether and dropped into the reaction flask in 30 minutes, while stirring. The reaction mixture was stirred overnight while bubbling a slow stream of acetylene therethrough. The ammonia was then evaporated, and to the residue was added one liter of water. The oil layer was removed, washed neutral, and dried over anhydrous calcium sulfate. On fractionation, 3,7,9-trimethyl-1-decyn-3-ol was obtained in the fraction distilling at 78.5° C./0.15 mm., $n_D^{25} = 1.4448$.

*Example 3*

356.5 g. (1.82 mols) of 3,7,9-trimethyl-1-decyn-3-ol was dissolved in 500 g. of n-hexane and 40 g. of lead-palladium-calcium carbonate catalyst (Lindlar, op. cit., p. 450) was added. The material was hydrogenated at one atmosphere hydrogen pressure and room temperature until 1.8 mols of hydrogen was taken up. The catalyst was filtered off and the filtrate was fractionated. 3,7,9-trimethyl-1-decen-3-ol was obtained in the fraction distilling at 107–108° C./2 mm., $n_D^{25}$=1.4430–1.4440. This compound has a very pleasant fresh leafy fragrance, with a champignon accent reminiscent of nonyl acetate. It can be used, for example, in perfume compositions of the chypre type.

I claim:
1. 6,8-dimethyl-2-nonanone.
2. 3,7,9-trimethyl-1-decyn-3-ol.
3. 3,7,9-trimethyl-1-decen-3-ol.

References Cited in the file of this patent
FOREIGN PATENTS 740,987   Germany _____ Nov. 2, 1943

OTHER REFERENCES

Powell et al.: J. Am. Chem. Soc. 53, 765–8 (1931).
Delaby: Bull. Soc. Chim. (5), 3, 2375–82 (1936).
Campbell et al.: J. Am. Chem. Soc. 63, 2683–5 (1941).
Chem. Abs. 48, 5782$h$ (1943).
Chem. Abs. 48, 13620$d$ (1954).